(12) United States Patent
Nakashima et al.

(10) Patent No.: US 11,578,450 B2
(45) Date of Patent: Feb. 14, 2023

(54) DAMPER AND WASHING MACHINE HAVING THE SAME

(71) Applicant: Samsung Electronics Co., Ltd., Suwon-si (KR)

(72) Inventors: Takahiro Nakashima, Yokohama (JP); Yoshiyuki Nishioka, Yokohama (JP); Yuichi Suzuki, Yokohama (JP); Kazushi Mori, Yokohama (JP); Hiroshi Shimbo, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 16/946,115

(22) Filed: Jun. 5, 2020

(65) Prior Publication Data

US 2020/0385911 A1 Dec. 10, 2020

(30) Foreign Application Priority Data

Jun. 5, 2019 (JP) .............................. JP2019-105153
Apr. 13, 2020 (KR) ........................ 10-2020-0044747

(51) Int. Cl.
*D06F 37/22* (2006.01)
*D06F 33/48* (2020.01)
(Continued)

(52) U.S. Cl.
CPC .............. *D06F 37/22* (2013.01); *D06F 33/48* (2020.02); *F16F 7/082* (2013.01); *F16F 7/09* (2013.01);
(Continued)

(58) Field of Classification Search
CPC .......... D06F 37/22; D06F 37/24; F16F 7/082; F16F 7/09
See application file for complete search history.

(56) References Cited

U.S. PATENT DOCUMENTS 5,207,081 A * 5/1993 Fuse ..................... F16F 15/027
68/23.1
2006/0011429 A1 1/2006 Park et al.
(Continued)

FOREIGN PATENT DOCUMENTS

EP 2692931 A1 2/2014
JP H06-31090 A 2/1994
(Continued)

OTHER PUBLICATIONS

International Search Report in connection with International Application No. PCT/KR2020/007012 dated Sep. 21, 2020, 3 pages.
(Continued)

*Primary Examiner* — Marc Lorenzi (57) ABSTRACT

A washing machine includes a water tub arranged in a case and a damper installed between the case and the water tub for damping vibrations of the water tub. The damper includes a plunger having one end supported on the case; a rod having one end supported on the water tub and the other end movably inserted to the plunger; a housing arranged to wrap around some of the plunger and the rod and including a friction member arranged between the housing and the plunger to contact an outer circumferential surface of the plunger; and a switching device configured to be in a first state in which the rod is coupled to the housing and able to move within the plunger along with the housing and a second state in which the rod is decoupled from the housing and able to move solely within the plunger.

15 Claims, 9 Drawing Sheets

(51) Int. Cl.
*F16F 7/08* (2006.01)
*F16F 7/09* (2006.01)
*D06F 103/46* (2020.01)
*D06F 105/46* (2020.01)

(52) U.S. Cl.
CPC ...... *D06F 2103/46* (2020.02); *D06F 2105/46* (2020.02)

(56) References Cited

U.S. PATENT DOCUMENTS

2008/0256986 A1    10/2008  Ackermann et al.
2014/0026623 A1*   1/2014   Kim ..................... D06F 37/20
                                                        68/142
2017/0321776 A1    11/2017  Bauer et al.

FOREIGN PATENT DOCUMENTS

| | | |
|---|---|---|
| JP | 3110561 B2 | 11/2000 |
| JP | 2006-029585 A | 2/2006 |
| JP | 2012-192096 A | 10/2012 |
| KR | 100606829 B1 | 8/2006 |

OTHER PUBLICATIONS

Supplementary European Search Report dated Mar. 28, 2022, in connection with European Application No. 20818359.0, 4 pages.
Communication under Rule 71(3) EPC dated Dec. 14, 2022 in connection with European Patent Application No. 20 818 359.0, 39 pages.

* cited by examiner

DAMPER AND WASHING MACHINE HAVING THE SAME

CROSS-REFERENCE TO RELATED APPLICATION

This application is based on and claims priority under 35 U. S. C. § 119 to Japanese Patent Application No. 2019-105153 filed on Jun. 5, 2019 and Korean Patent Application No. 10-2020-0044747 filed on Apr. 13, 2020, the disclosures of which are incorporated herein by reference in their entirety.

BACKGROUND

1. Field of the Invention

The disclosure relates to a damper and washing machine having the damper.

2. Discussion of Related Art

For conventional washing machines, it is proposed to increase damping force of a damper in a resonant frequency band of a tub (water tank) at a low number of revolutions in an initial phase of a spin-dry course while reducing the damping force of the damper for high-speed revolutions of the tub.

For example, a washing machine as disclosed in JP Publication No. 2006-29585 is equipped with a damper cylinder, a shaft inserted from an end of the damper cylinder to move back and forth in a direction of the length of the damper cylinder, and a friction member provided for the shaft to dampen vibrations by friction with the inner wall of the damper cylinder and to be movable in a direction perpendicular to the direction of the length of the damper cylinder.

SUMMARY

The disclosure provides a damper for suppressing vibrations of a water tub of a washing machine in a simple structure.

The disclosure also provides a damper for suppressing vibrations of not only a washing machine but also at least one of two members that are moved relatively to each other in a simple structure.

The disclosure also provides a damper for suppressing vibrations in a simple structure and a washing machine having the damper.

According to an aspect of the disclosure, a washing machine includes a case; a water tub arranged in the case and having a spin-dry tub rotationally installed in the water tub; and a damper installed between the case and the water tub for damping vibrations of the water tub, wherein the damper includes a plunger having one end supported on the case; a rod having one end supported on the water tub and the other end movably inserted to the plunger; a housing arranged to wrap around outer circumferential surfaces of some of the plunger and the rod and including a friction member arranged between the housing and the plunger to contact an outer circumferential surface of the plunger; and a switching device having a first state in which the rod is coupled to the housing and able to move within the plunger along with the housing while the friction member is in contact with the outer circumferential surface of the plunger, and a second state in which the rod is decoupled from the housing and able to move solely within the plunger.

The switching device may include a coupling member coupled to the rod to allow the housing and the rod to be coupled to each other, and a driving member shifting the coupling member to be coupled to the rod or decoupled from the rod.

The coupling member may include a rectangular parallelepiped-shaped portion, a projection protruding from the rectangular parallelepiped-shaped portion, and a plurality of bumps protruding from the rectangular parallelepiped-shaped portion to the rod.

The driving member may include a case fixed to the housing, a working rod having one end received in the case and fixed to the projection and the other end protruding out from the case to move the coupling member, a supporting member installed at the other end of the working rod, and a coil spring having one end supported on the case and the other end supported on the supporting member.

When a voltage is applied to the driving member to generate propulsion force to the working rod, the working rod may enable the coupling member to be moved toward the rod, the plurality of bumps to be coupled to the rod, and thus the housing and the rod to be coupled to each other.

When the damper extends or contracts while the housing and the rod are in a coupled state, the rod and the housing may be moved to or from the plunger together, causing damping force of the damper to be increased due to frictional force created between the friction member and the outer circumferential surface of the plunger.

When voltage application to the driving member is stopped, the working rod may make the coupling member moved to a direction away from the rod, the plurality of bumps decoupled from the rod, and thus the housing and the rod decoupled from each other.

When the damper extends or contracts while the housing and the rod are in a decoupled state, the rod may be solely moved to or from the plunger, causing frictional force to be created between the plunger and the rod, and as the frictional force is less than frictional force created between the friction member and the outer circumferential surface of the plunger, damping force of the damper may be less than in the coupled state in which the housing and the rod are coupled to each other.

The plunger may include a pipe having the form of a cylinder to which the rod is inserted, and a base arranged on a side of the pipe and supported on the water tub.

The rod may include a rod-shaped portion inserted to the plunger, and a base arranged on a side of the rod-shaped portion and supported on the case.

The rod-shaped portion may include a plurality of concave portions sunken from an outer circumferential surface of the rod-shaped portion and fitted and coupled with the plurality of bumps.

The housing may include a cover member wrapping around outer circumferential surfaces of some of the plunger and the rod and accommodating the friction member, and a restricting member arranged at an end of the cover member for restricting movement of the friction member.

The cover member may include a first cylindrical portion equipped with the restricting member and having inner diameter less than outer diameter of the friction member to accommodate the friction member fitted between the plunger and the first cylindrical portion, a second cylindrical portion having inner diameter less than the inner diameter of the first cylindrical portion to restrict movement of the friction member in an opposite direction to the restricting member, and a third cylindrical portion having inner diameter less than the inner diameter of the second cylindrical portion and larger than outer diameter of the rod to allow the rod to be able to slide therein.

The rod may include a projection arranged to protrude from an outer circumferential surface of the rod for restricting movement of the rod by being caught by the third cylindrical portion when the damper is extended.

To prevent damage from collision of an end of the housing with the base of the plunger when the damper is contracted, the projection may be located such that an end of the rod is closer to the base of the plunger than the end of the housing when the damper extends and the projection is caught by the third cylindrical portion.

According to another aspect of the disclosure, a damper may include a plunger having one end supported on one of two members which move relatively; a rod having one end supported on the other one of the two members and the other end movably inserted to the plunger; a housing arranged to wrap around outer circumferential surfaces of some of the plunger and the rod and including a friction member arranged between the housing and the plunger to contact an outer circumferential surface of the plunger; and a switching device having a first state in which the rod is coupled to the housing and able to move within the plunger along with the housing while the friction member is in contact with the outer circumferential surface of the plunger, and a second state in which the rod is decoupled from the housing and able to move solely within the plunger.

The switching device may include a coupling member coupled to the rod to allow the housing and the rod to be coupled to each other, and a driving member shifting the coupling member to be coupled to the rod or decoupled from the rod.

The coupling member may include a rectangular parallelepiped-shaped portion, a projection protruding from the rectangular parallelepiped-shaped portion, and a plurality of bumps protruding from the rectangular parallelepiped-shaped portion to the rod to be coupled to or decoupled from the rod.

The driving member may include a case fixed to the housing, a working rod having one end received in the case and fixed to the projection and the other end protruding out from the case to move the coupling member, a supporting member installed at the other end of the working rod, and a coil spring having one end supported on the case and the other end supported on the supporting member.

According to another aspect of the disclosure, a damper may include: a plunger having one end supported on one of two members which move relatively; a rod having one end supported on the other one of the two members and the other end movably inserted to the plunger; a housing arranged to wrap around outer circumferential surfaces of some of the plunger and the rod and including a friction member arranged between the housing and the plunger to contact an outer circumferential surface of the plunger; and a switching device switching between a state in which the rod is coupled to the housing and a state in which the rod is decoupled from the housing to change damping force due to frictional force created when the rod is moved within the plunger.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments and features as described and illustrated in the disclosure are merely examples, and there may be various modifications replacing the embodiments and drawings at the time of filing this application.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or chamber discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "front", "rear", "upper", "lower", "top", and "bottom" as herein used are defined with respect to the drawings, but the terms may not restrict the shape and position of the respective components.

Embodiments of the present disclosure will now be described in detail with reference to accompanying drawings.

Figure 1:
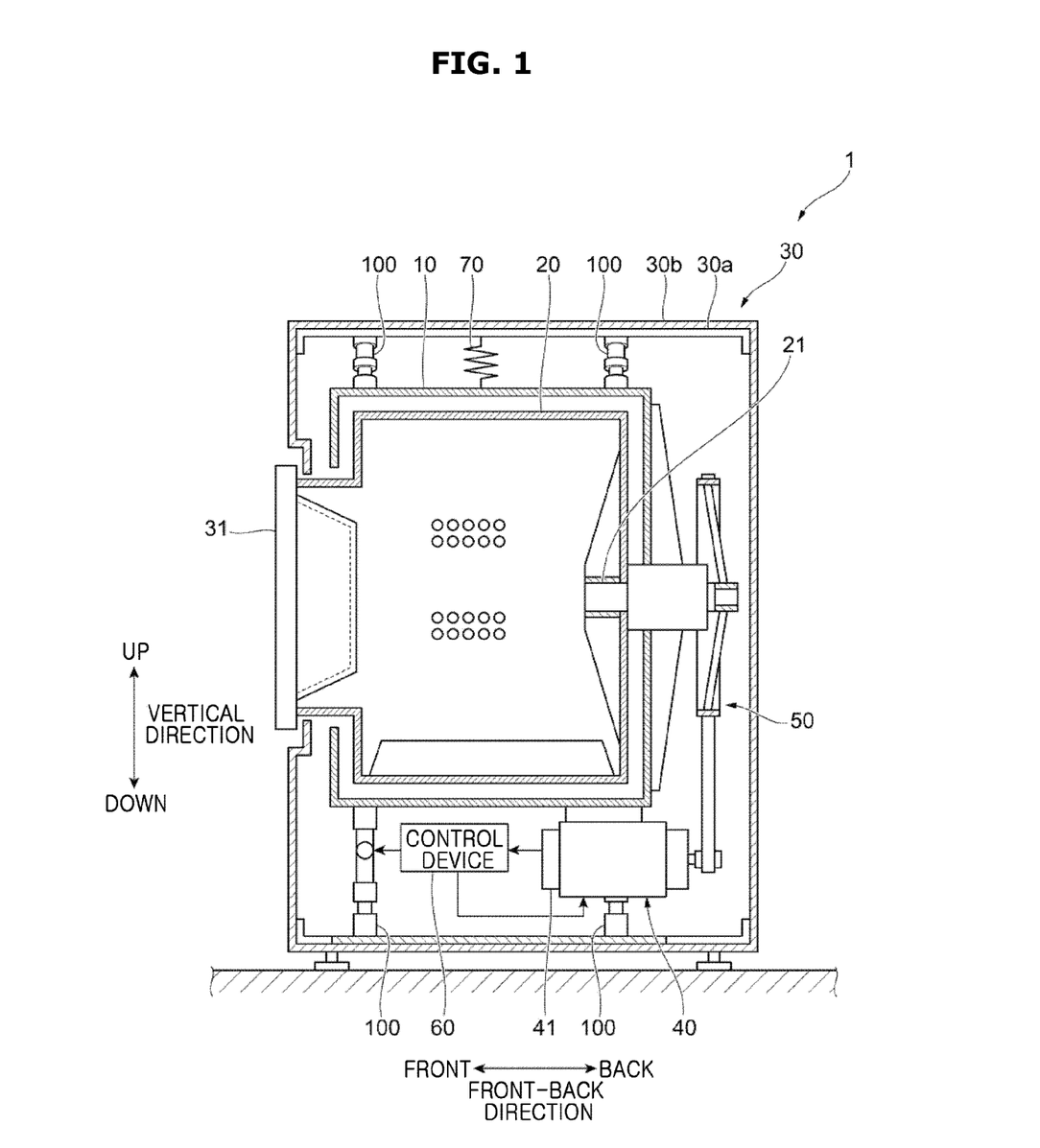
FIG. 1 illustrates a schematic diagram of a washing machine, according to an embodiment of the disclosure.

FIG. 1 illustrates a schematic diagram of a washing machine 1, according to an embodiment of the disclosure. Specifically, FIG. 1 illustrates a cross-sectional view of the washing machine 1 viewed from the right. In FIG. 1, the left direction is a forward direction of the washing machine 1, the right direction is a backward direction of the washing machine 1, the upper direction is an upward direction of the washing machine 1, and the lower direction is a downward direction of the washing machine 1.

In an embodiment of the disclosure, the washing machine 1 may include a water tub 10, a spin-dry tub 20 as an example of a rotating body rotationally mounted in the water tub 10, and a case 30 for accommodating the water tub 10 and the spin-dry tub 20.

A rotation shaft 21 of the spin-dry tub 20 extends in a front-back direction, and the spin-dry tub 20 is rotated to the left, e.g., counterclockwise when the washing machine 1 is viewed from the front.

The case 30 is shaped substantially like a rectangular parallelepiped, including a frame 30a made with steel and an iron plate 30b having less hardness than that of the frame 30a. An opening is formed on the front of the case 30, through which to put in laundry, and a door 31 is installed on the case 30 to open or close the opening.

The washing machine 1 may further include a motor 40, a transferrer 50 for transferring rotational force of the motor 40 to the rotation shaft 21 of the spin-dry tub 20, and a control device 60 for controlling operation of the motor 40.

The motor 40 may be, for example, a three-phase brushless motor including a rotation angle detector 41 for detecting a rotation angle of the motor 40, such as a resolver, a rotary encoder, etc.

The transferrer 50 may include a pulley mounted on the rotation shaft 21, a belt looped around the pulley, and the like.

The control device 60 is an arithmetic and logic operation circuit including a central processing unit (CPU), a read only memory (ROM), a random access memory (RAM), a backup RAM, etc. The control device 60 may include at least one processor. The control device 60 may receive an output signal from the rotation angle detector 41 of the motor 40. The control device 60 may set a target current required to be applied to the motor 40 based on e.g., the output signal from the rotation angle detector 41 and perform feedback control based on the target current.

The washing machine 1 may also include a spring 70 installed between the frame 30a of the case 30 and the water tub 10. For example, there may be a plurality of springs 70.

The washing machine 1 may also include a damper 100 installed between the frame 30a of the case 30 and the water tub 10 for damping vibrations of the water tub 10. For example, the washing machine 1 may include four dampers 100 coupled between four bottom corners of the water tub 10 and the frame 30a on the bottom of the case 30. Furthermore, the washing machine 1 may include two dampers 100 coupled between front and rear portions of the top of the water tub 10 and the frame 30a of the top left portion of the case 30, and two dampers 100 coupled between front and rear portions of the right top of the water tub 10 and the frame 30a on the top right of the case 30. One of the eight dampers 100 may be omitted, or an additional damper 100 may be added to the eight dampers 100.

Figure 2:
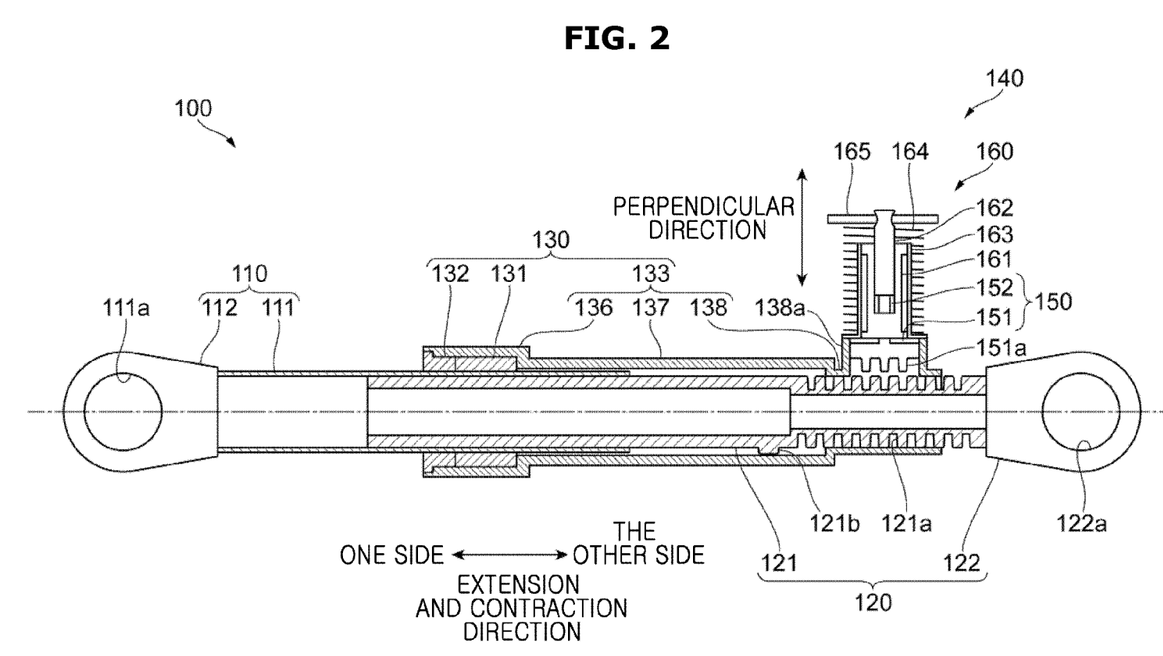
FIG. 2 illustrates a schematic diagram of a damper.

FIG. 2 illustrates a schematic diagram of the damper 100, according to an embodiment of the disclosure.

The damper 100 may include a plunger 110 as an example of a supported member with one end supported on the case 30, and a rod 120 as an example of a rod-shaped member with one end supported on the water tub 10 and the other end inserted into the plunger 110. Furthermore, the damper 100 may include a housing 130 to cover around some of the plunger 110 and the rod 120. The damper 100 may also include a switching device 140 as an example of a switching means that switches between a first state in which the rod 120 and the housing 130 are unified to allow the housing 130 to be moved along with the rod 120 to or from the plunger 110 and a second state in which the rod 120 is decoupled from the housing 130. One end of the plunger 110 may be supported on the water tub 10, and one end of the rod 120 may be supported on the case 30.

The plunger 110 may include a cylindrical pipe 111, and a base 112 to retain the pipe 111. A pin hole 111a may be formed in the base 112 for a pin to be put therethrough to couple the plunger 110 to the water tub 10. For example, the pin hole 111a is shaped like a cylinder.

The rod 120 may include a rod-shaped portion 121, and a base 122 to retain the rod-shaped portion 121.

The rod-shaped portion 121 may have the form of e.g., a cylinder. The outer diameter of the rod-shaped portion 121 is equal to or less than the inner diameter of the pipe 111 of the plunger 110, and the other end of the rod-shaped portion 121 opposite to the base 122 is inserted to the pipe 111 of the plunger 110. The damper 100 extends or contracts when the plunger 110 slides within the pipe 111 of the plunger 110.

In the following description, a center line direction of the rod-shaped portion 121, i.e., a moving direction of the rod-shaped portion 121 to or from the plunger 110 is simply referred to as a "extension and contraction direction". Furthermore, in the extension and contraction direction, a side of the water tub 10 is referred to as one side, and a side of the case 30 is referred to as the other side.

A concave portion 121a sunken from the outer circumference may be formed at an end of the rod-shaped portion 121 on the side of the base 122. For example, the concave portion 121a may have a spiral form. The form of the concave portion 121a is not, however, limited thereto. The concave portion 121a may extend in a direction perpendicular to the extension and contraction direction. In some cases, there may be a plurality of (e.g., 5) concave portions 121a formed in the extension and contraction direction. Furthermore, the concave portions 121a may be formed around the entire outer circumference of the rod-shaped portion 121, or two concave portions 121a may be formed on the circumference at an interval of 180 degrees.

Moreover, a projection 121b protruding from the outer circumference of the rod-shaped portion 121 may be formed at a location nearer to a center portion of the rod-shaped portion 121 than the concave portion 121a is. Position and size of the projection 121b will be described later.

A pin hole 122a may be formed in the base 122 for a pin to be put therethrough to couple the rod 120 to the case 30. For example, the pin hole 122a is shaped like a cylinder.

The housing 130 may include a friction member 131 as an example of a contact body arranged around the pipe 111 to contact the outer circumference of the pipe 111 of the plunger 110, a cover member 133 for covering the friction member 131, and a restricting member 132 for restricting movement of the friction member 131.

The friction member 131 is shaped like a cylinder. When the rod 120 is coupled to the housing 130 by the switching device 140, the rod 120 may be able to move along with the housing 130 within the plunger 110 while the friction member 131 is in contact with the outer circumference of the plunger 110. When the rod 120 is decoupled from the housing 130 by the switching device 140, only the rod 120 may be able to move within the plunger 110.

The friction member 131 may be formed with any material that has good wear resistance. For example, the friction member 131 may be made with urethane resin or urethane rubber. In another example, the friction member 131 may be made with nitrile-butadiene rubber (NBR), hydrogenated NBR (H-NBR), ethylene-propylene rubber, e.g., EPDM, styrene-butadiene rubber (SBR), or natural rubber. In yet another example, the friction member 131 may be made with thermosetting resin or thermoplastic resin. The thermosetting resin may include, but not exclusively to, e.g., phenolic resin and epoxy resin. The thermoplastic resin may include, but not exclusively to, e.g., polyamide resin, polyimide resin, and polycarbonate resin. Alternatively, the material of the friction member 131 may be a metal. The metal may include, e.g., copper and brass.

The cover member 133 has the form of three cylindrical portions, a first cylindrical portion 136, a second cylindrical portion 137, and a third cylindrical portion 138 with different inner and outer diameter, sequentially arranged from one side to the other side in the extension and contraction direction.

The first cylindrical portion 136 is longer than the friction member 131 in the extension and contraction direction. Inner diameter of the first cylindrical portion 136 is smaller than the outer diameter of the friction member 131. The first cylindrical portion 136 has the friction member 131 put in between the first cylindrical portion 136 and the pipe 111 of the plunger 110. The inner diameter of the first cylindrical portion 136 and the thickness of the friction member 131 are set such that the inner circumferential surface and the outer circumferential surface of the friction member 131 keep in contact with the outer circumferential surface of the pipe 111 and the inner circumferential surface of the first cylindrical portion 136, respectively, and friction is created between the inner circumferential surface of the friction member 131 and the outer circumferential surface of the pipe 111 and the outer circumferential surface of the friction member 131 and the inner circumferential surface of the first cylindrical portion 136.

The inner diameter of the second cylindrical portion 137 is smaller than the outer diameter of the friction member 131. An end on one side of the second cylindrical portion 137 in the extension and contraction direction restricts movement of the friction member 131 to the other side. The inner diameter of the second cylindrical portion 137 is larger than the outer diameter of the pipe 111 of the plunger 110. The housing 130 is able to move relatively to the pipe 111.

The inner diameter of the third cylindrical portion 138 is smaller than the inner diameter of the second cylindrical portion 137, and larger than the outer diameter of the rod-shaped portion 121 of the rod 120. The rod-shaped portion 121 of the rod 120 is able to slide within the third cylindrical portion 138.

A distance from the center line of the rod 120 to the projection 121b of the rod-shaped portion 121 is smaller than the inner radius of the second cylindrical portion 137 and larger than inner radius of the third cylindrical portion 138. This makes the projection 121b of the rod-shaped portion 121 collide with an end of the third cylindrical portion 138, thereby restricting movement of the housing 130 to the other side of the rod 120.

A mounting portion 138a in which the switching device 140 is mounted is formed in the third cylindrical portion 138. The mounting portion 138a has a cylindrical portion to support a coupling member 150 of the switching device 140, which will be described later, to be able to slide.

The restricting member 132 is mounted in the first cylindrical portion 136 to close an opening of an end of the first cylindrical portion 136 of the cover member 133. For example, the restricting member 132 is fixed to the first cylindrical portion 136 by a fastening member such as a screw. In another example, the restricting member 132 may be forcibly fitted into the first cylindrical portion 136. Furthermore, the restricting member 132 may have a seal function to inhibit invasion of foreign materials such as dust into the housing 130.

The switching device 140 may include the coupling member 150 with a bump 151a coupled to the concave portion 121a formed at the rod 120, and a driving member 160 to move the coupling member 150. The coupling member 150 may be coupled to the rod 120 to allow the housing and the rod 120 to be coupled to or decoupled from each other. The driving member 160 may shift the coupling member 150 to be coupled to or decoupled from the rod 120.

The coupling member 150 includes a rectangular parallelepiped-shaped portion 151 and a projection 152 protruding from the rectangular parallelepiped-shaped portion 151, and is moved in a direction perpendicular to the extension and contraction direction.

The rectangular parallelepiped-shaped portion 151 includes bumps 151a protruding from a side facing the rod 120 toward the rod 120 in the extension and contraction direction at regular intervals (e.g., there are three projections bumps 151a in this embodiment of the disclosure). The bumps 151a extend in a perpendicular direction to the paper of FIG. 2.

On the other side opposite the side of the rectangular parallelepiped portion 151 where the bumps 151a are formed, there is the projection 152 formed in a direction perpendicular to the extension and contraction direction. In the following description, the direction perpendicular to the extension and contraction direction is sometimes referred to as a perpendicular direction.

For example, the driving member 160 is a so-called solenoid actuator that converts electric energy to mechanical energy using electromagnetic force.

The driving member 160 may include a coil, a core 161, and a working rod 162 guided to the core 161. The driving member 160 may also include a case 163 covering the coil, the core 161, and the working rod 162, and a coil spring 164 arranged around the case 163.

The working rod 162 has an end facing the coupling member 150 received in the case 163 and the other end opposite to the coupling member 150 protruding from the case 163. A supporting member 165 may be installed at the other end of the working rod 162 protruding from the case 163 to support an end of the coil spring 164. Furthermore, the end of the working rod 162 facing the coupling member 150 may be fixed to the projection 152 of the coupling member 150.

The case 163 may be fixed to the housing 130. For example, the case 163 may be fixed to the third cylindrical portion 138 of the housing 130 by a fastening member such as a bold or a screw. The case 163 may support an end of the coil spring 164.

For example, the supporting member 165 may have the form of a disc.

Figure 3:
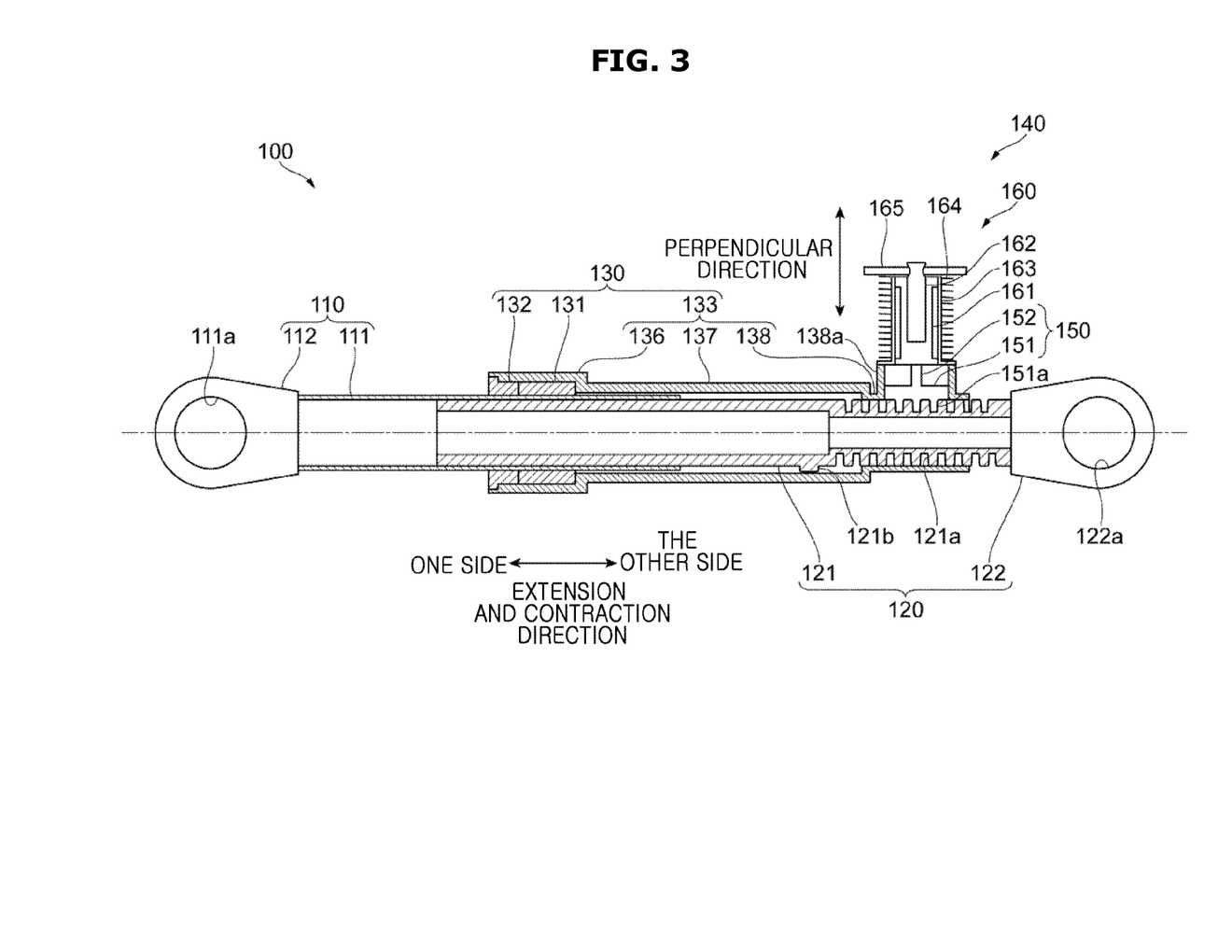
FIG. 3 illustrates an example of a coupled state.

FIG. 3 illustrates an example of a coupled state.

In the switching device 140 as described above, as a voltage is applied to the driving member 160 and a current flows in the coil of the driving member 160 through a lead wire, a propulsion force in the perpendicular direction occurs to the working rod 162. The working rod 162 is then moved toward the rod 120 and the coupling member 150 fixed to the working rod 162 is also moved to the rod 120. This makes the bump 151a of the coupling member 150 fitted to the concave portion 121a formed on the rod 120. The state in which the bump 151a is fitted into the concave portion 121a will also be referred to as a coupled state. The coupled state is an example of the aforementioned first state.

When the voltage application to the driving member 160 is stopped, no propulsion force occurs to the working rod 162, so the working rod 162 is moved to an opposite direction away from the rod 120 according to elastic force of the coil spring 164 and the coupling member 150 is also moved to the opposite direction. This makes the bump 151a of the coupling member 150 fall out of the concave portion 121a formed on the rod 120, i.e., in a state of not being fitted to the concave portion 121a. The state in which the bump 151a is not fitted to the concave portion 121a will also be called a decoupled state. FIG. 2 shows an example of a decoupled state. The decoupled state is an example of the aforementioned second state.

Voltage application to the driving member 160 may be controlled by the control device 60. The control device 60 applies a voltage to the driving member 16 when rotation speed N of the motor 40 is within a predefined rotation speed range Nt. On the other hand, the control device 60 applies no voltage to the driving member 16 when rotation speed N of the motor 40 is out of the predefined rotation speed range Nt. For example, the control device 60 may determine the rotation speed N of the motor 40 based on a rotation angle of the motor 40 detected by the rotation angle detector 41, such as a resolver mounted on the motor 40. In another example, the control device 60 may determine the rotation speed N of the motor 40 based on a target value of a current applied to the motor 40.

Figure 4:
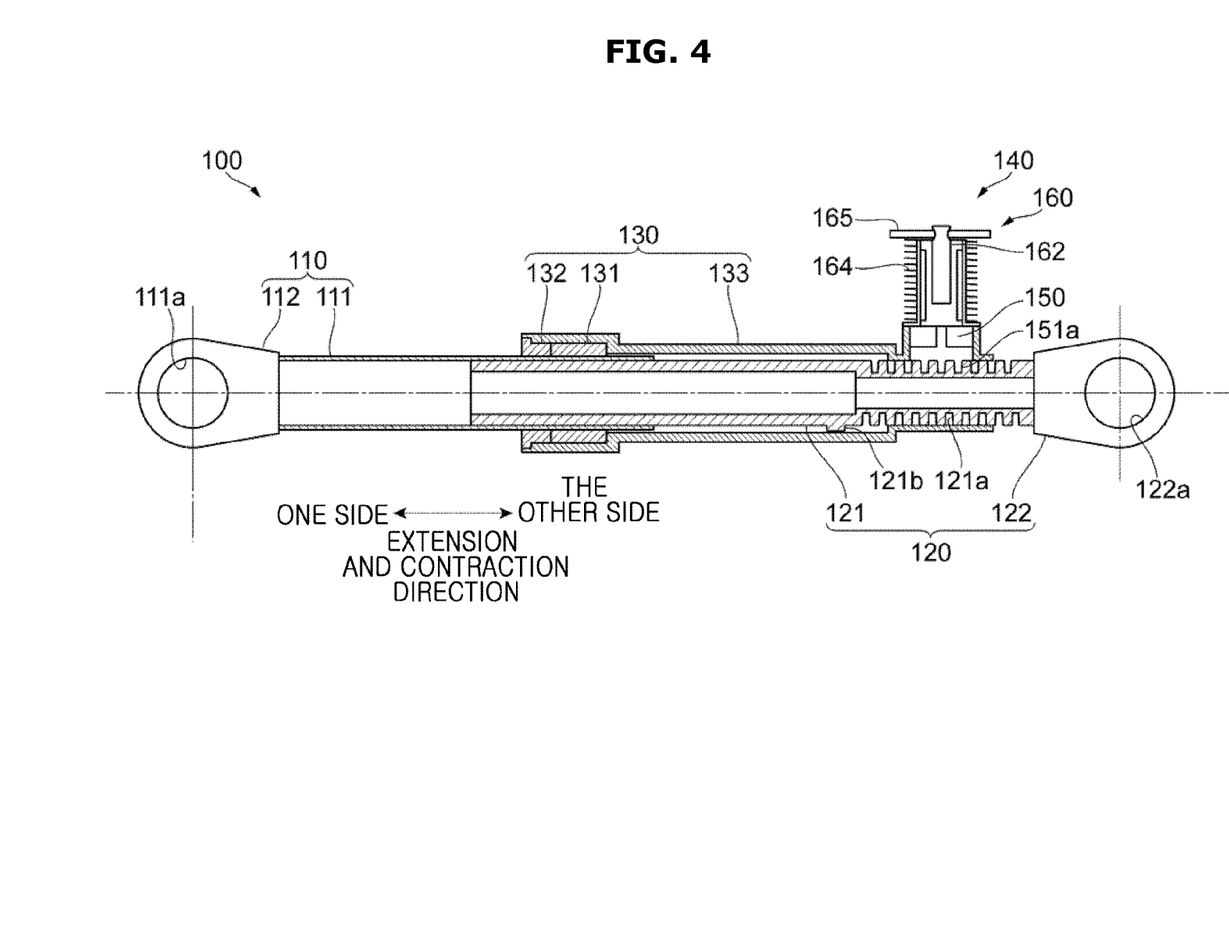
FIG. 4 illustrates an example of an extended damper in a coupled state.
Figure 5:
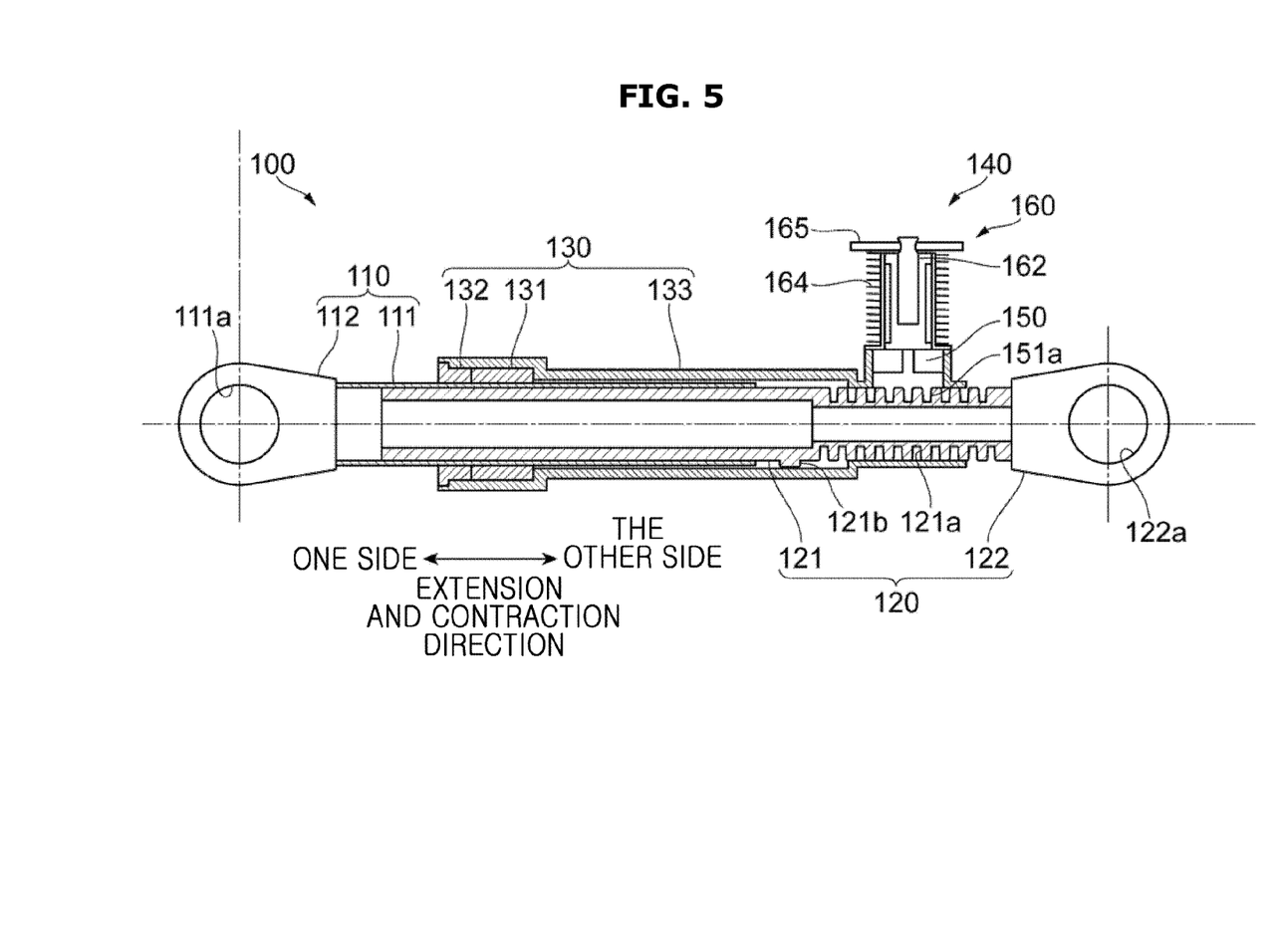
FIG. 5 illustrates an example of a contracted damper in a coupled state.
Figure 6:
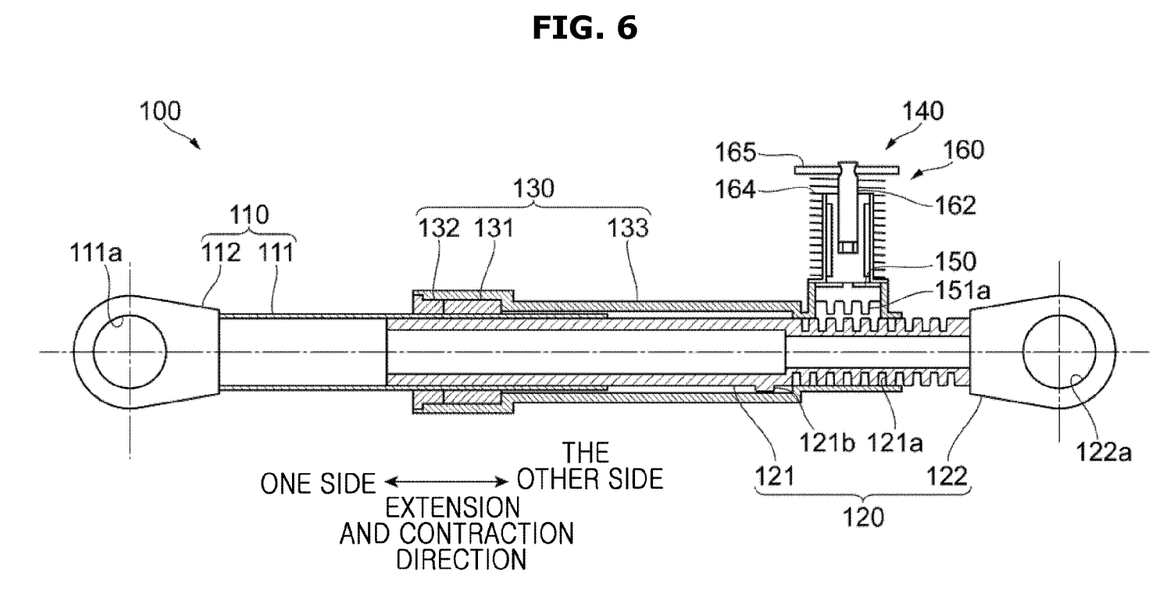
FIG. 6 illustrates an example of an extended damper in a decoupled state.
Figure 7:
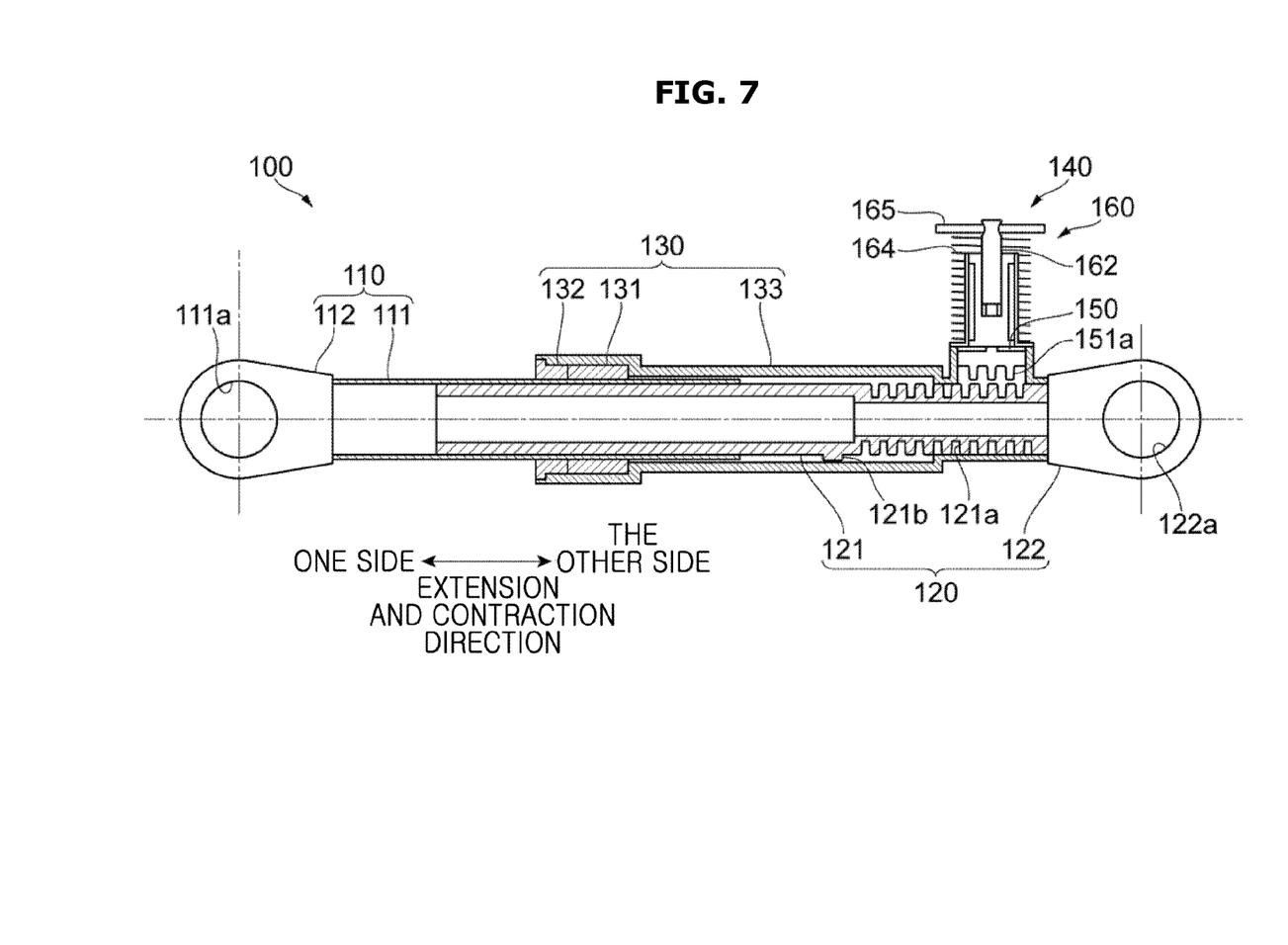
FIG. 7 illustrates an example of a contracted damper in a decoupled state.

FIG. 4 illustrates an example of an extended damper in a coupled state, and FIG. 5 illustrates an example of a contracted damper in the coupled state. FIG. 6 illustrates an example of an extended damper in a decoupled state, and FIG. 7 illustrates an example of a contracted damper in the decoupled state.

In the washing machine 1 having the structure as described above, as the control device 60 applies a voltage to the driving member 160 when the rotation speed N of the motor 40 falls within the predefined rotation speed range Nt, the bump 151a of the coupling member 150 of the switching device 140 is fitted into the concave portion 121a formed on the rod 120, i.e., in the coupled state. Referring to FIGS. 4 and 5, in the coupled state, the rod 120 and the housing 130 may be unified and moved to or from the plunger 110. Specifically, the housing 130 and the plunger 110 are moved relatively to each other while the friction member 131 of the housing 130 comes into contact with the outer circumferential surface of the plunger 110. Hence, damping force occurs to the damper 100 caused by the frictional force created between the friction member 131 and the plunger 110.

The frictional force created between the friction member 131 and the plunger 110 may vary depending on the force applied to the friction member 131 to press and contact the outer circumferential surface of the plunger 110 by the first cylindrical portion 136 of the housing 130. The frictional force may also vary depending on thickness of the friction member 131, i.e., a difference between outer radius and inner radius of the friction member 131 and a difference between outer diameter of the friction member 131 and inner diameter of the first cylindrical portion 136. Furthermore, the frictional force may also depend on the material of the friction member 131. Hence, the damping force of the damper 100 may depend on the thickness or material of the friction member 131, or a difference between the outer diameter of the friction member 131 and inner diameter of the first cylindrical portion 136.

For example, the predefined rotation speed range Nt may include the rotation speed N of the motor 40 at which the washing machine 1 is resonated, e.g., about 100 rpm to about 300 rpm.

As the control device 60 applies no voltage to the driving member 160 when the rotation speed N of the motor 40 is out of the predefined rotation speed range Nt, the bump 151a of the coupling member 150 of the switching device 140 is in a decoupled state of not being fitted into the concave portion 121a formed on the rod 120. Referring to FIGS. 6 and 7, in the decoupled state, the rod 120 and the housing 130 are not unified but decoupled from each other, so the rod 120 may be moved relatively to the plunger 110 while the housing 130 is not moved to or from the plunger 110. Hence, damping force caused by the frictional force created between the friction member 131 and the plunger 110 may not occur to the damper 100. As frictional force created between the plunger 110 and the rod 120 is trivial as compared to the frictional force created between the friction member 131 and the plunger 110, damping force at a speed out of the predefined rotation speed range Nt is weak.

Figure 8:
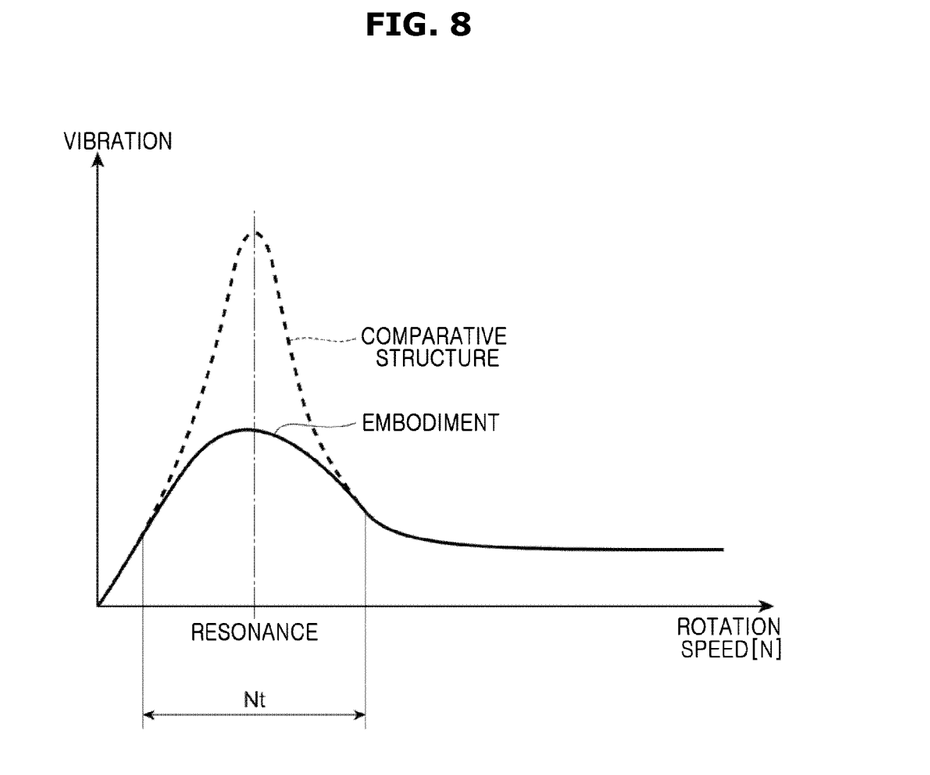
FIG. 8 illustrates an example of relationships between rotation speed of a motor and vibration of a water tub.

FIG. 8 illustrates an example of relationships between the rotation speed N of the motor 40 and vibration of the water tub 10. The solid line represents vibrations of the water tub 10 of the washing machine 1 according to this embodiment of the disclosure, and the dashed line represents vibrations of the water tub 10 of a washing machine with a comparative structure. The washing machine with the comparative structure is not equipped with damper 100 unlike the washing machine 1 according to the embodiment of the disclosure.

As shown in FIG. 8, when the rotation speed N of the motor 40 does not fall within the predefined rotation speed range Nt, as damping force due to the frictional force created between the friction member 131 and the plunger 110 does not occur to the damper 100, vibrations of the washing machine 1 according to the embodiment of the disclosure and the washing machine with the comparative structure are substantially the same. Otherwise, when the rotation speed N of the motor 40 falls within the predefined rotation speed range Nt, as damping force due to the frictional force created between the friction member 131 and the plunger 110 occurs to the damper 100, vibrations of the washing machine 1 according to the embodiment of the disclosure is smaller than those of the washing machine with the comparative structure.

Furthermore, as compared with e.g., a washing machine to which damping force due to the frictional force created by the friction member 131 occurs at a speed out of the predefined rotation speed range Nt (hereinafter, also called a washing machine with another comparative structure), the vibrations of the water tub 10 at the speed out of the predefined rotation speed range Nt are hardly transferred to the case 30 in the washing machine 1 according to the embodiment of the disclosure. Accordingly, the washing machine 1 according to the embodiment of the disclosure has smaller vibrations of the case 30 at the speed out of the predefined rotation speed range Nt than those of the washing machine with another comparative structure.

With smaller vibrations of the washing machine 1 according to the embodiment of the disclosure than those of the washing machine with comparative structure or with another comparative structure, vibrations of the case 30 of the washing machine 1 or vibrations on the floor on which the washing machine 1 is installed are reduced as well. Noise due to the vibrations is also reduced.

Accordingly, with the washing machine 1 according to the embodiment of the disclosure, interference between the water tub 10 and the iron plate 30b of the case 30 from vibrations of the water tub 10 or the case 30 may be inhibited. Even when the vibrations occur, the distance between the water tub 10 and the iron plates 30b of the case 30 is not narrower than in the washing machine with the comparative structure or with another structure, so the washing machine 1 may have a larger sized water tub 10 with the same sized case 30. As a result, the washing machine 1 according to the embodiment of the disclosure may accommodate more laundry volume without the need to increase a size in appearance defined by the outer surface of the case 30.

Furthermore, with the damper 100 as described above, the aforementioned effects may be obtained without complicating the structure. Specifically, for the damper 100, the friction member 131 is provided inside the housing 130 that covers around the plunger 110 or the rod 120, to create frictional force between the friction member 131 and the outer circumferential surface of the plunger 110. This structure of the damper 100 is simpler than e.g., a structure with a member equipped with a friction member provided inside the plunger 110 or the rod 120. Furthermore, it is also simpler than e.g., another structure in which a member equipped with a friction member is provided between the housing 130 and the plunger 110 or the rod 120, separately from the housing 130.

With the damper 100 in the embodiment of the disclosure, when the size of the friction member 131 is constant, frictional force between the friction member 131 and the outer circumferential surface of the plunger 110, further the damping force of the damper 100 may be changed by changing the inner diameter of the first cylindrical portion 136 of the housing 130. Hence, for example, when it is desired to change the damping force for certain type of washing machine, the damping force may be changed simply by changing the inner diameter of the first cylindrical portion 136 of the housing 130 without changing the size of the friction member 131.

In the damper 100 of the embodiment of the disclosure, the rod 120 and the housing 130 with the friction member 131 may be unified by coupling the bump 151a of the coupling member 150 from outside to the concave portion formed on the outer circumferential surface of the rod 120. The coupling member 150 is moved to a direction perpendicular to the extension and contraction direction to couple the bump 151a to the concave portion 121a. Hence, the damper 100 has a structure that is simpler than a structure to rotate a member (corresponding to the housing 130 of the damper 100) having the friction member 131 to unify the member and the rod 120.

The coupling member 150 is moved in a direction perpendicular to the extension and contraction direction. Furthermore, the frictional force between the friction member 131 and the outer circumferential surface of the plunger 110 is created by force applied to the friction member 131 to press and contact the plunger 110, not by the driving member 160 to determine the force by the inner diameter of the first cylindrical portion 136 of the housing 130. That is, the driving member 160 can create force to such an extent that may enable coupling or decoupling of the bump 151a of the coupling member 150 to or from the concave portion 121a formed on the outer circumferential surface of the rod 120. For example, instead of a structure of unifying the rod 120 and the housing 130 using the coupling member 150, a structure of forcing the friction member to the outer circumferential surface of the rod 120 and using the frictional force created between the friction member and the outer circumferential surface of the rod 120 to unify the rod 120 and the housing 130 (hereinafter, called a second comparative structure) may be taken into account. With the second comparative structure, in order to create frictional force to move the friction member in the perpendicular direction for unification, electromagnetic force of the driving member 160 can be increased and for this, the coil or the core 161 can be larger. By contrast, with the damper 100 in the embodiment of the disclosure, it is possible to use a small solenoid actuator as the driving member 160. The solenoid actuator has a good response property and is able to instantly switch between the coupled state and the decoupled state, allowing damping force to be changed with high accuracy depending on the rotation speed N of the motor 40. With the second comparative structure, when it is desired to change the damping force for a certain type of washing machine, electromagnetic force of the driving member 160 can be changed, and the driving member 160 can be larger to increase the damping force. By contrast, with the damper 100 of the embodiment of the disclosure, it is possible to change the damping force just by changing the inner diameter of the first cylindrical portion 136 of the housing 130.

Furthermore, when a voltage is applied to the driving member 160 for the coupled state, as the washing machine 1 vibrates even though a position of the bump 151a of the coupling member 150 and a position of the concave portion 121a of the rod 120 do not match and the bump 151a comes into contact with the outer circumferential surface of the rod 120, the rod 120 is moved to the coupling member 150 and thus the bump 151a is coupled to the concave portion 121a. Accordingly, with the damper 100 according to the embodiment of the disclosure, the coupled state may be attained with desired timing. The moving direction of the coupling member 150 may not be perpendicular to the extension and contraction direction. For example, the moving direction of the coupling member 150 may be inclined to the extension and contraction direction and the direction perpendicular to the extension and contraction direction.

Furthermore, as the damper 100 of the embodiment of the disclosure has a structure of generating damping force using the frictional force of the friction member 131, the damper 100 is smaller than a damper to generate damping force using e.g., a magnetorhological (MR) fluid. Specifically, the MR fluid based damper tends to be enlarged because it fills itself with the MR fluid, but the damper 100 according the embodiment of the disclosure may be reduced in size because it does not need to be filled with a fluid such as the MR fluid. Furthermore, the damper that generates damping force using the MR fluid needs to change its design such as an amount of the MR fluid to change the damping force for a certain type of washing machine. By contrast, with the damper 100 of the embodiment of the disclosure, the damping force may be simply changed by changing the inner diameter of the first cylindrical portion 136 of the housing 130.

Moreover, as described above, the damper 100 according to the embodiment of the disclosure may reduce vibrations of the water tub 10 even with the simple structure. This is because the damper 100 is provided not only between the bottom of the water tub 10 and the bottom of the case 30 but also between the top of the water tub 10 and the left and right ends of the case 30, making it in the coupled state even at the rotation speed N resonated in the left and right direction of the water tub 10.

Figure 9:
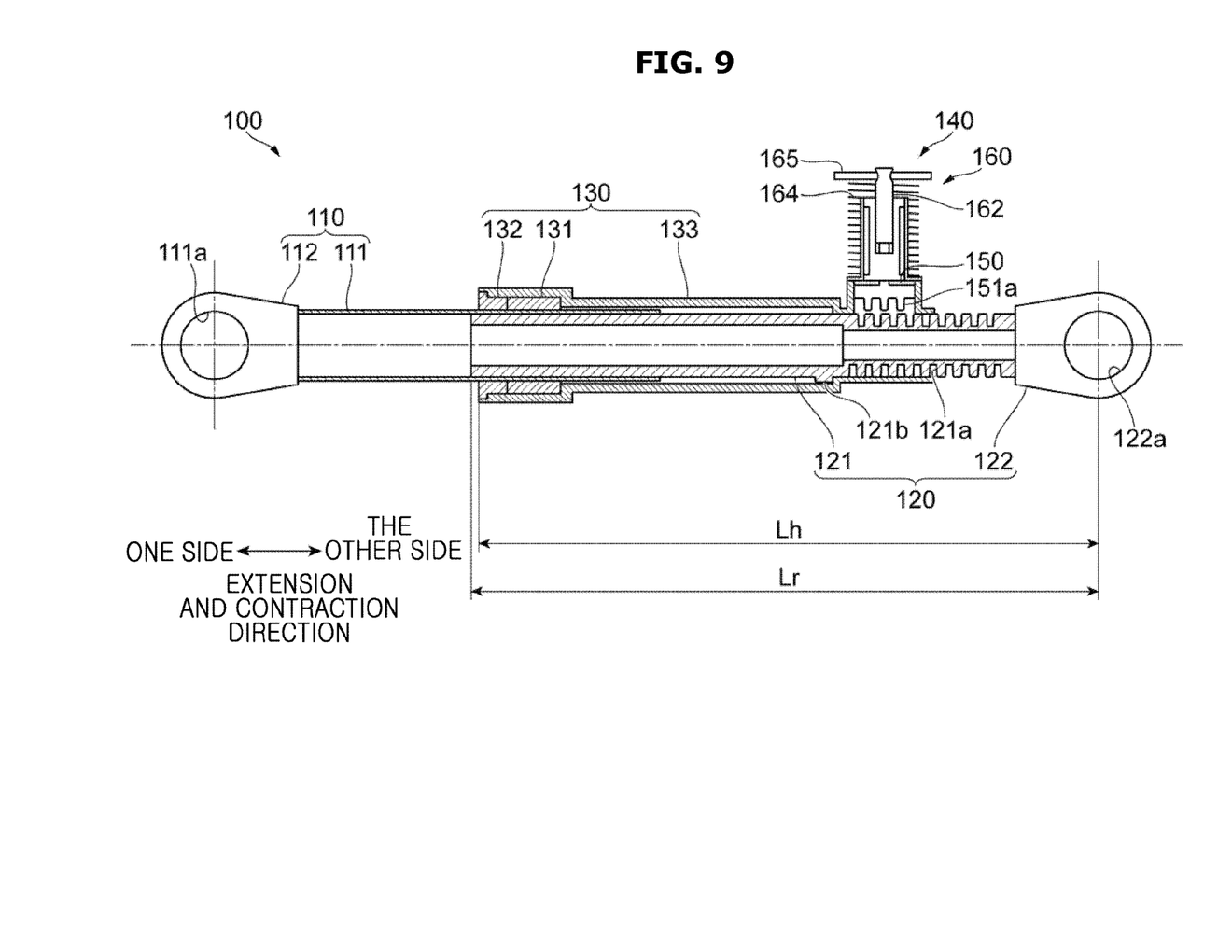
FIG. 9 illustrates a diagram for describing a position of a projection arranged in a rod-shaped portion of a rod.

FIG. 9 illustrates a diagram for describing a position of the projection 121b formed on the rod-shaped portion 121 of the rod 120.

The projection 121b formed on the rod 120 is provided in a position such that a distance Lh from the hole center of the pin hole 122a formed at the base 122 as an example of a supported end supported on the water tub 10 to an end of the housing 130 is less than a distance Lr from the hole center of the pin hole 122a to the front end of the rod 120.

The reason will be described below. When an end of the housing 130 collides with the base 112 of the plunger 110 in the coupled state in which the rod 120 and the housing 130 are unified, the switching device 140 may be damaged. Specifically, in the coupled state, when the damper 100 has a big stroke and so the end of the housing 130 collides with the base 112 of the plunger 110, shock power from the collision may be delivered to and may damage the switching device 140. With the damper 100 according to the embodiment of the disclosure, as the projection 121b formed on the rod 120 is located such that the distance Lh is less than the distance Lr, the rod 120 collides with the base 112 of the plunger 110 when the damper 100 is contracted. Accordingly, the switching device 140 may be inhibited from being damaged by collision of the end of the housing 130 with the base 112 of the plunger 110.

Specifically, to prevent the damage from collision of the end of the housing 130 with the base 112 of the plunger 110 when the damper 100 is contracted, the projection 121b may be located such that the end of the rod 120 is closer to the base 112 of the plunger 110 than the end of the housing 130 when the damper 100 extends and the projection 121b is caught by the third cylindrical portion 138.

In the embodiment of the disclosure, the damper 100 is applied to the washing machine 1, such that an end of the plunger 110 supports a member on a side of the case 30 or the water tub 10 and an end of the rod 120 supports a member on the other side of the case 30 or the water tub 10, but the structure is not limited thereto. For example, the damper 100 may be provided between two members that may move relatively to each other. Specifically, an end of the plunger 110 may support one of the two members that move relatively, and an end of the rod 120 may support the other of the two members while the other end of the rod 120 is inserted to the plunger 110.

According to an embodiment of the disclosure, a damper for suppressing vibrations in a simple structure and a washing machine having the damper may be provided.

Several embodiments of the disclosure have been described above, but a person of ordinary skill in the art will understand and appreciate that various modifications can be made without departing the scope of the disclosure. Thus, it will be apparent to those ordinary skilled in the art that the true scope of technical protection is only defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A washing machine comprising:
a case;
a water tub arranged in the case and comprising a spin-dry tub rotationally installed in the water tub; and
a damper installed between the case and the water tub and configured to dampen vibrations of the water tub,
wherein the damper comprises:
a plunger having one end supported on the case;
a rod having one end supported on the water tub and another end movably inserted into the plunger;
a housing arranged to wrap around a portion of an outer circumferential surface of the plunger and a portion of an outer circumferential surface of the rod, the housing including a friction member including a contact body and arranged between the housing and the plunger to contact the outer circumferential surface of the plunger; and
a switching device comprising a coupler and an actuator, and configured to be positioned in:
a first state in which the rod is coupled to the housing, the rod configured to move within the plunger along with the housing while the friction member is in contact with the outer circumferential surface of the plunger in the first state, and
a second state in which the rod is disengaged from the housing, the rod configured to move solely within the plunger in the second state.

2. The washing machine of claim 1, wherein the switching device comprises:
a coupling member comprising the coupler and coupled to the rod, the coupling member configured to couple the housing and the rod to each other; and
a driving member comprising the actuator and configured to shift the coupling member to couple to the rod or to decouple from the rod.

3. The washing machine of claim 2, wherein the coupling member comprises:
a rectangular parallelepiped-shaped portion;
a projection protruding from the rectangular parallelepiped-shaped portion; and
a plurality of bumps protruding from the rectangular parallelepiped-shaped portion to the rod.

4. The washing machine of claim 3, wherein the driving member comprises:
a driving member case fixed to the housing;
a working rod having one end received in the driving member case and fixed to the projection and another end protruding out from the driving member case and configured to move the coupling member;
a spring support installed at the another end of the working rod; and a coil spring having one end supported on the driving member case and another end supported on the spring support.

5. The washing machine of claim 4, wherein, when a voltage is applied to the driving member to generate propulsion force to the working rod, the working rod is configured to move the coupling member and the plurality of bumps toward the rod to couple the plurality of bumps to the rod, and thereby couple the housing and the rod to each other.

6. The washing machine of claim 5, wherein, when the damper extends or contracts while the housing and the rod are in a coupled state, the rod and the housing are configured to move to or from the plunger together, causing a damping force of the damper to be increased due to a frictional force created between the friction member and the outer circumferential surface of the plunger.

7. The washing machine of claim 6, wherein, when voltage application to the driving member is stopped, the working rod is configured to move the coupling member and the plurality of bumps to a direction away from the rod to decouple the plurality of bumps from the rod, and thereby decouple the housing and the rod from each other.

8. The washing machine of claim 7, wherein, when the damper extends or contracts while the housing and the rod are in a decoupled state, the rod is configured to solely move to or from the plunger, causing a frictional force to be created between the plunger and the rod, and due to the frictional force between the plunger and the rod being less than a frictional force created between the friction member and the outer circumferential surface of the plunger, the damping force of the damper while the housing and the rod are in the decoupled state is less than the damping force of the damper while the housing and the rod are in the coupled state.

9. The washing machine of claim 3, wherein the rod comprises:
- a rod-shaped portion inserted into the plunger; and
- a base arranged on a side of the rod-shaped portion and supported on the case.

10. The washing machine of claim 9, wherein the rod-shaped portion comprises a plurality of concave portions sunken from an outer circumferential surface of the rod-shaped portion and fitted and coupled with the plurality of bumps.

11. The washing machine of claim 1, wherein the plunger comprises:
- a pipe having a form of a cylinder into which the rod is inserted; and
- a base arranged on a side of the pipe and supported on the water tub.

12. The washing machine of claim 1, wherein the housing comprises:
- a cover member wrapped around a portion of the outer circumferential surface of the plunger and a portion of the outer circumferential surface of the rod and configured to accommodate the friction member; and
- a restricting member comprising a plug arranged at an end of the cover member and configured to restrict movement of the friction member.

13. The washing machine of claim 12, wherein the cover member comprises:
- a first cylindrical portion equipped with the restricting member and having an inner diameter less than an outer diameter of the restricting member to accommodate the friction member fitted between the plunger and the first cylindrical portion;
- a second cylindrical portion having an inner diameter less than the inner diameter of the first cylindrical portion to restrict movement of the friction member in an opposite direction to the restricting member; and
- a third cylindrical portion having an inner diameter less than the inner diameter of the second cylindrical portion and larger than an outer diameter of the rod to allow the rod to be able to slide therein.

14. The washing machine of claim 13, wherein the rod comprises a projection arranged to protrude from the outer circumferential surface of the rod and configured to restrict movement of the rod by being caught by the third cylindrical portion when the damper is extended.

15. The washing machine of claim 14, wherein, to prevent damage from collision of an end of the housing with a base of the plunger when the damper is contracted, the projection is located such that an end of the rod is closer to the base of the plunger than the end of the housing when the damper extends and the projection is caught by the third cylindrical portion.

* * * * *